(12) United States Patent
Murashige et al.

(10) Patent No.: US 10,964,473 B2
(45) Date of Patent: Mar. 30, 2021

(54) COIL UNIT, WIRELESS POWER TRANSMISSION DEVICE, WIRELESS POWER RECEIVING DEVICE, AND WIRELESS POWER TRANSMISSION SYSTEM

(71) Applicant: TDK CORPORATION, Tokyo (JP)

(72) Inventors: Takuya Murashige, Tokyo (JP); Shoma Asai, Tokyo (JP); Masahide Ohnishi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 60 days.

(21) Appl. No.: 16/367,911

(22) Filed: Mar. 28, 2019

(65) Prior Publication Data

US 2019/0304678 A1    Oct. 3, 2019

(30) Foreign Application Priority Data

Mar. 30, 2018   (JP) .............................. JP2018-070100

(51) Int. Cl.
*H01F 38/14* (2006.01)
*H02J 50/12* (2016.01)
*B60L 53/12* (2019.01)
*H02J 7/02* (2016.01)

(52) U.S. Cl.
CPC .............. *H01F 38/14* (2013.01); *H02J 50/12* (2016.02); *B60L 53/12* (2019.02); *B60Y 2200/91* (2013.01); *B60Y 2300/91* (2013.01); *H02J 7/025* (2013.01)

(58) Field of Classification Search
CPC ........... H01F 38/14; H02J 50/12; H02J 7/025; B60L 53/12; B60Y 2200/91; B60Y 2300/91
See application file for complete search history.

(56) References Cited

U.S. PATENT DOCUMENTS 6,664,863 B1 * 12/2003 Okamoto ............ H01F 17/0006
                                                    257/E23.142
6,876,877 B2 *  4/2005 Eden .......................... H01P 1/20
                                                    333/205

FOREIGN PATENT DOCUMENTS

JP   2017-084685 A   5/2017
JP   2017-084865 A   5/2017

* cited by examiner

*Primary Examiner* — Dinh T Le
(74) *Attorney, Agent, or Firm* — Oliff PLC

(57) ABSTRACT

The coil unit includes a planar coil, a magnetic body and a capacitor module, the capacitor module has a substrate, capacitor elements mounted on the substrate, and a first connecting terminal and a second connecting terminal provided outside an element region on which capacitor elements are mounted, the first connecting terminal is provided inside a winding section as viewed in a plan view, the second connecting terminal is provided outside the winding section as viewed in a plan view, a direction in which the first connecting terminal and the second connecting terminal are connected is perpendicular to a direction in which the conductor extends in the winding section of the planar coil, the coil unit in which the element region is provided in a range overlapping the winding section of the coil as viewed in a plan view is selected.

21 Claims, 7 Drawing Sheets

COIL UNIT, WIRELESS POWER TRANSMISSION DEVICE, WIRELESS POWER RECEIVING DEVICE, AND WIRELESS POWER TRANSMISSION SYSTEM

BACKGROUND

The present disclosure relates to a coil unit, a wireless power transmission device, a wireless power receiving device, and a wireless power transmission system.

Priority is claimed on Japanese Patent Application No. 2018-070100, filed on Mar. 30, 2018, the content of which is incorporated herein by reference.

In recent years, when charging of a mobile device, an electric automobile, or the like, is performed, a wireless power transmission technology for transmitting electric power in a wireless manner using an electromagnetic induction mechanism between a primary (power transmission) coil and a secondary (power receiving) coil that face each other has been attracting attention.

As a device configured to perform power transmission using wireless power transmission technology, for example, a wireless power transmission device is known. A wireless power transmission device is constituted by a primary coil provided on a power transmission device and a secondary coil provided on a power receiving device, and performs transmission of electric power by linking a magnetic flux generated by the primary coil to the secondary coil.

In addition, in a wireless power transmission device, in order to perform power transmission efficiently, configuring a resonance circuit by connecting a capacitor to the primary coil and the secondary coil is known. A capacitor module (may also be referred to as "a capacitor unit") having a plurality of capacitor elements mounted on a substrate is used as the capacitor, and the capacitor module may be provided to be integrated with the coils.

Here, Japanese Unexamined Patent Application, First Publication No. 2017-084865 discloses a coil unit (may also be referred to as "an LC circuit unit") used in a non-contact power supply system. In the coil unit disclosed in Japanese Unexamined Patent Application, First Publication No. 2017-084865, a configuration in which a capacitor module is provided on a winding center portion of a coil has been proposed.

SUMMARY

Incidentally, in a wireless power transmission device, in the case in which dispersion occurs in a magnetic flux generated from the primary (power transmission) coil in a coil circumferential direction, when a positional deviation occurs between the primary coil and the secondary coil, properties of the coils may vary according to a direction of the positional deviation. For this reason, in the primary (power transmission) coil and the secondary (power receiving) coil that constitute a wireless power transmission device, it is desired to minimize dispersion of the magnetic flux generated by the coil in the coil circumferential direction.

However, in the coil unit disclosed in Japanese Unexamined Patent Application, First Publication No. 2017-084865, since the magnetic symmetry of the coil is not considered, dispersion may occur in a magnetic flux generated by the coil in the coil circumferential direction due to a connecting position between the coil and the capacitor module.

In addition, in the coil unit disclosed in Japanese Unexamined Patent Application, First Publication No. 2017-084865, since the capacitor module is disposed on a winding center portion of the coil, linkage may easily occur in the magnetic flux generated by the coil, and the capacitor module may generate heat. Dispersion may occur in the magnetic flux generated by the coil in the coil circumferential direction also due to this heat generation.

In consideration of the above-mentioned circumstances, an object of the present disclosure is directed to providing a coil unit in which power transmission efficiency is able to be further improved while dispersion of a magnetic flux generated by a coil in a coil circumferential direction is able to be minimized, a wireless power transmission device, a wireless power receiving device, and a wireless power transmission system each including such a coil unit.

A coil unit of the present disclosure includes: a coil having a conductor formed in a spiral shape; a capacitor module connected to the coil and constituting a resonance circuit; and a magnetic body provided between the coil and the capacitor module, wherein the capacitor module has: a substrate having a first main surface and a second main surface facing each other in a thickness direction, a plurality of capacitor elements mounted on at least one main surface of the first main surface and the second main surface of the substrate, a first connecting terminal provided outside an element region on which the plurality of capacitor elements are mounted when the substrate is viewed in a plan view, and a second connecting terminal provided outside the element region to face the first connecting terminal with the element region sandwiched therebetween when the substrate is viewed in a plan view, either one connecting terminal of the first connecting terminal and the second connecting terminal is provided inside a portion in which the conductor of the coil is: formed in a spiral shape as viewed in a plan view; and electrically connected to a first wiring section extending inward from one end side of the portion in which the conductor of the coil is formed in a spiral shape, the other connecting terminal is: provided outside the portion in which the conductor of the coil is formed in a spiral shape as viewed in a plan view; and electrically connected to a second wiring section extending outward from other end side of the portion in which the conductor of the coil is formed in a spiral shape, and a direction in which the first connecting terminal and the second connecting terminal are connected is perpendicular to a direction in which the conductor extends in the portion in which the conductor of the coil is formed in a spiral shape, and the element region is provided in a range overlapping the portion in which at least the conductor of the coil is formed in a spiral shape as viewed in a plan view.

As described above, according to the present disclosure, it is possible to provide a coil unit in which power transmission efficiency is able to be further improved while dispersion of a magnetic flux generated by a coil in a coil circumferential direction is able to be minimized, a wireless power transmission device, a wireless power receiving device, and a wireless power transmission system each including such a coil unit.

DETAILED DESCRIPTION

Figure 1:
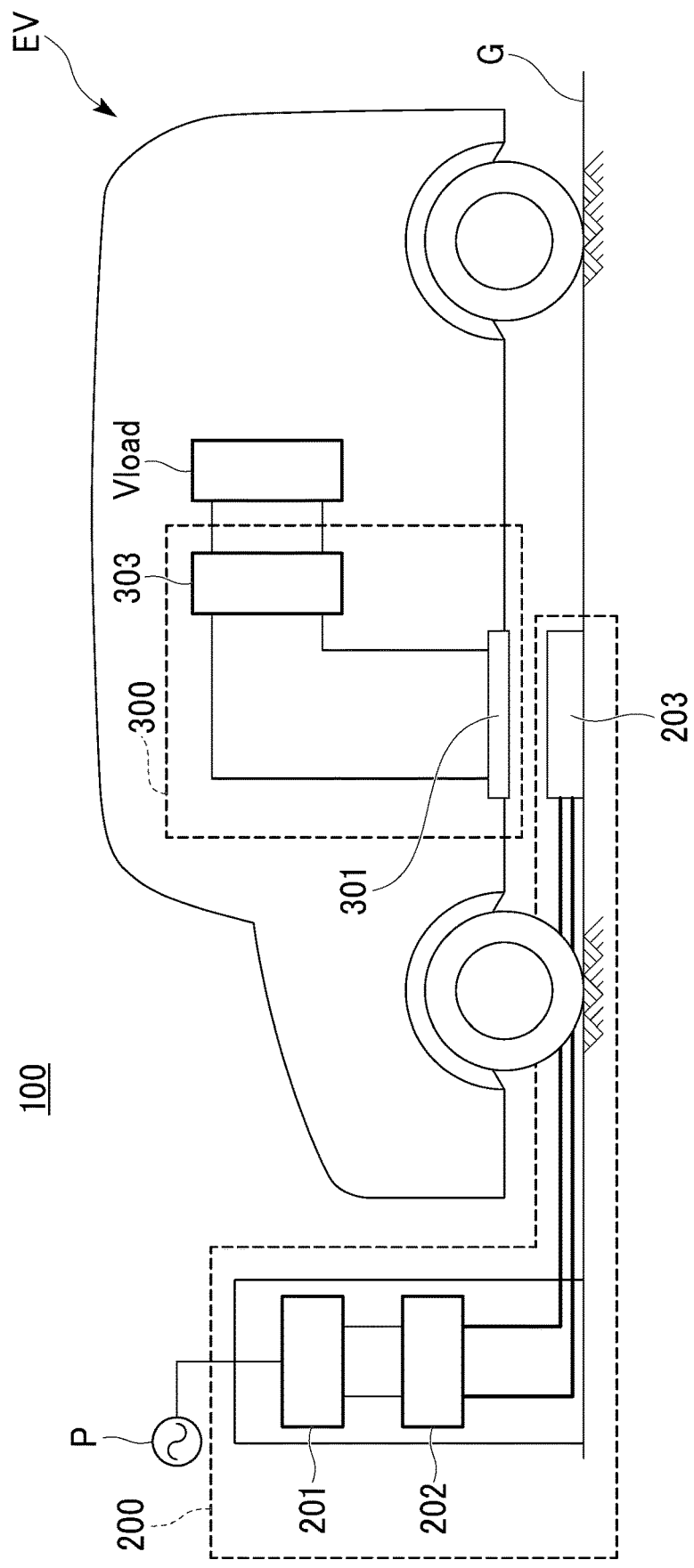
FIG. 1 is a configuration view showing an example of a wireless power transmission system according to an embodiment of the present disclosure.

Hereinafter, an embodiment of the present disclosure will be described in detail with reference to the accompanying drawings.

Further, in the drawings used in the following description, for the convenience of easy understanding of characteristics, characteristic parts may be enlarged, and dimensional ratios or the like between components may not necessarily be the same as actual ratios. In addition, materials, dimensions, or the like, exemplified in the following description are merely examples, and the present disclosure is not necessarily limited thereto and appropriate changes may be made without departing from the spirit of the present disclosure.

(Wireless Power Transmission System)

Figure 2:
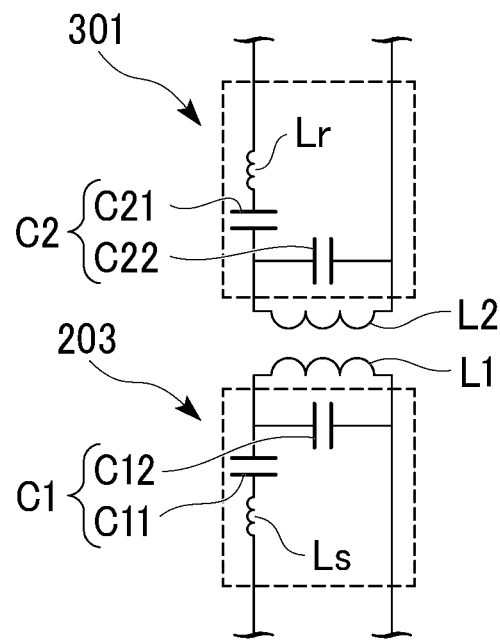
FIG. 2 is a circuit diagram showing a configuration of a power transmission coil unit and a power receiving coil unit of the wireless power transmission system in FIG. 1.

First, as an embodiment of the present disclosure, for example, a wireless power transmission system 100 shown in FIG. 1 and FIG. 2 will be described. FIG. 1 is a configuration view showing an example of the wireless power transmission system 100. FIG. 2 is a circuit diagram showing a configuration of a power transmission coil unit 203 and a power receiving coil unit 301 of the wireless power transmission system 100.

As shown in FIG. 1 and FIG. 2, the wireless power transmission system 100 of the embodiment performs wireless charging of a battery (a secondary battery) mounted on an electric automobile EV. The electric automobile EV is an electrically driven vehicle (a moving body) that travels due to being driven by a motor using electric power charged into the battery. While the wireless power transmission system 100 is applied to the electric automobile EV in the embodiment, the wireless power transmission system may be applied to a moving body, a mobile device, or the like, other than the electric automobile EV, in another embodiment.

The wireless power transmission system 100 includes a wireless power transmission device 200 and a wireless power receiving device 300. The wireless power transmission device 200 is installed on the ground G on the side of charging equipment. The wireless power receiving device 300 is mounted on the electric automobile EV.

The wireless power transmission device 200 includes a conversion circuit 201, a power transmission circuit 202, and the power transmission coil unit 203. The wireless power receiving device 300 includes the power receiving coil unit 301 and a rectification smoothing circuit 303. Further, a load Vload is disposed outside the wireless power receiving device 300.

The conversion circuit 201 functions as an AC/DC power supply electrically connected to an external commercial power supply P and configured to convert an alternating current voltage input from the commercial power supply P into a desired direct current voltage. The conversion circuit 201 is electrically connected to the power transmission circuit 202. The conversion circuit 201 supplies the converted direct current voltage to the power transmission circuit 202.

For the conversion circuit 201, any configuration may be used as long as a direct current voltage is output to the power transmission circuit 202 and the configuration is not particularly limited. As the conversion circuit 201, a conversion circuit obtained by combining a rectifying circuit configured to rectify an alternating current voltage and convert the alternating current voltage into a direct current voltage and a power factor correction (PFC) circuit configured to improve a power factor; a conversion circuit obtained by combining a rectifying circuit and a switching circuit such as a switching converter or the like, or the like, may be exemplified.

The power transmission circuit 202 converts a direct current voltage supplied from the conversion circuit 201 into an alternating current voltage. As the power transmission circuit 202, a switching circuit or the like to which a plurality of switching elements are bridge-connected may be exemplified. The power transmission circuit 202 is electrically connected to the power transmission coil unit 203. The power transmission circuit 202 supplies an alternating current voltage having a driving frequency controlled on the basis of a resonance frequency of a first LC resonance circuit, which will be described below, included in the power transmission coil unit 203, to the power transmission coil unit 203.

The power transmission coil unit 203 includes a first LC resonance circuit and a magnetic body (not shown). The magnetic body (not shown) will be described later in detail in the section for the "(coil unit)," which will be described below.

The first LC resonance circuit includes a power transmission coil L1 and a power transmission-side capacitor C1. When a resonance frequency of the first LC resonance circuit approaches (including also "coincides with") a resonance frequency on the side of the power receiving coil unit 301, magnetic resonance type wireless power transmission becomes possible. In addition, in another embodiment, the power transmission coil unit may not include an LC resonance circuit. That is, in another embodiment, the power transmission coil unit may not include a power transmission-side capacitor.

In the power transmission coil unit 203 of the embodiment, a reactor Ls is configured to be inserted in series with the power transmission-side capacitor C1. In the case of this configuration, an imaginary part of an impedance of a wireless power transmission network constituted by the power transmission coil unit 203, the power receiving coil unit 301, the rectification smoothing circuit 303 and the load Vload is easily controlled such that it becomes positive. The reactor Ls has an impedance which is higher than a frequency component that is sufficiently higher than a resonance frequency on the side of the power transmission coil unit 203. Accordingly, the reactor Ls can function as a filter configured to remove a high frequency component.

The power transmission coil L1 is constituted by a coil for wireless power transmission. The power transmission coil L1 of the embodiment is installed on the ground G or buried in the ground G to face a floor bottom of the electric automobile EV. Further, in the embodiment, a configuration in which the power transmission coil L1 (the power transmission coil unit 203) is installed on the ground G together with the conversion circuit 201 may be provided.

The power transmission-side capacitor C1 has a function of adjusting a resonance frequency. While the power transmission-side capacitor C1 of the embodiment is constituted by a first capacitor C11 serially connected to the power transmission coil L1 and a second capacitor C12 connected in parallel with the power transmission coil L1, the power transmission-side capacitor C1 is not limited to such a configuration. For example, the power transmission-side capacitor C1 may be constituted by only the first capacitor C11 serially connected to the power transmission coil L1.

The power receiving coil unit 301 includes a second LC resonance circuit and a magnetic body (not shown). The magnetic body (not shown) will be described in detail in the section for the "(coil unit)," which will be described below.

The second LC resonance circuit includes a power receiving coil L2 and a power receiving-side capacitor C2. When a resonance frequency of the second LC resonance circuit approaches (including also "coincides with") a resonance frequency on the side of the power transmission coil unit 203, magnetic resonance type wireless power transmission becomes possible. In addition, in another embodiment, the power receiving coil unit may not include an LC resonance circuit. That is, in another embodiment, the power receiving coil unit may not include a power receiving-side capacitor.

In the power receiving coil unit 301 of the embodiment, a reactor Lr is configured to be inserted in series with the power receiving-side capacitor C2. In the case of the configuration, the reactor Lr has an impedance higher than a frequency component that is sufficiently higher than a resonance frequency on the side of the power receiving coil unit 301. Accordingly, the reactor Lr functions as a filter configured to remove a high frequency component.

The power receiving coil L2 is constituted by a coil for wireless power transmission. The power receiving coil L2 of the embodiment is installed on the floor bottom of the electric automobile EV to face the power transmission coil L1 installed on the ground G or buried in the ground G.

The power receiving-side capacitor C2 has a function of adjusting a resonance frequency. While the power receiving-side capacitor C2 of the embodiment is constituted by a third capacitor C21 serially connected to the power receiving coil L2 and a fourth capacitor C22 connected in parallel with the power receiving coil L2, the power receiving-side capacitor C2 is not limited to such a configuration. For example, the power receiving-side capacitor C2 may be constituted by only the third capacitor C21 serially connected to the power receiving coil L2.

The rectification smoothing circuit 303 is electrically connected to the power receiving coil unit 301, and rectifies an alternating current voltage supplied from the power receiving coil L2 and converts the alternating current voltage into a direct current voltage. As the rectification smoothing circuit 303, a half wave rectification smoothing circuit constituted by a switching element or a diode and a smoothing capacitor; a full wave rectification smoothing circuit constituted by four switching elements or diodes, which are bridge-connected, and a smoothing capacitor, or the like, may be exemplified. The rectification smoothing circuit 303 is electrically connected to the load Vload. The rectification smoothing circuit 303 supplies the converted direct current power to the load Vload. Further, in the wireless power receiving device 300, a configuration in which a charging circuit is installed between the rectification smoothing circuit 303 and the load Vload may be provided.

The load Vload is connected between output terminals of the rectification smoothing circuit 303. A direct current voltage is supplied from the rectification smoothing circuit 303. As the load Vload, a battery, a motor, or the like, mounted on the above-mentioned electric automobile EV may be exemplified.

The load Vload can be regarded as a resistance load having an equivalent resistance value that varies over time according to a demand state (a storage state or a consumption state) of electric power. Further, power consumption in the rectification smoothing circuit 303 is sufficiently smaller than power consumption in the load Vload.

In the power transmission system 100 including the above-mentioned configuration, electric power can be transmitted wirelessly from the wireless power transmission device 200 to the wireless power receiving device 300 according to a magnetic resonance method using a resonance (resound) phenomenon between the power transmission coil unit 203 and the power receiving coil unit 301. That is, in the magnetic resonance method, when the resonance frequency of the first LC resonance circuit and the resonance frequency of the second LC resonance circuit approach (also including "coincide with") each other, the high frequency current and voltage in the vicinity of the resonance frequency can be applied to the power transmission coil unit 203, and electric power can be transmitted (supplied) wirelessly to the power receiving coil unit 301 that electromagnetically resonates (resounds). Further, the wireless power transmission device 200 and the wireless power receiving device 300 may include a communication circuit configured to perform communication between the wireless power transmission device 200 and the wireless power receiving device 300.

Accordingly, in the power transmission system 100 of the embodiment, wireless charging of the battery mounted on the electric automobile EV can be performed while electric power supplied from the charging equipment side is transmitted wirelessly to the electric automobile EV with no connection to a charging cable.

(Coil Unit)

Figure 3:
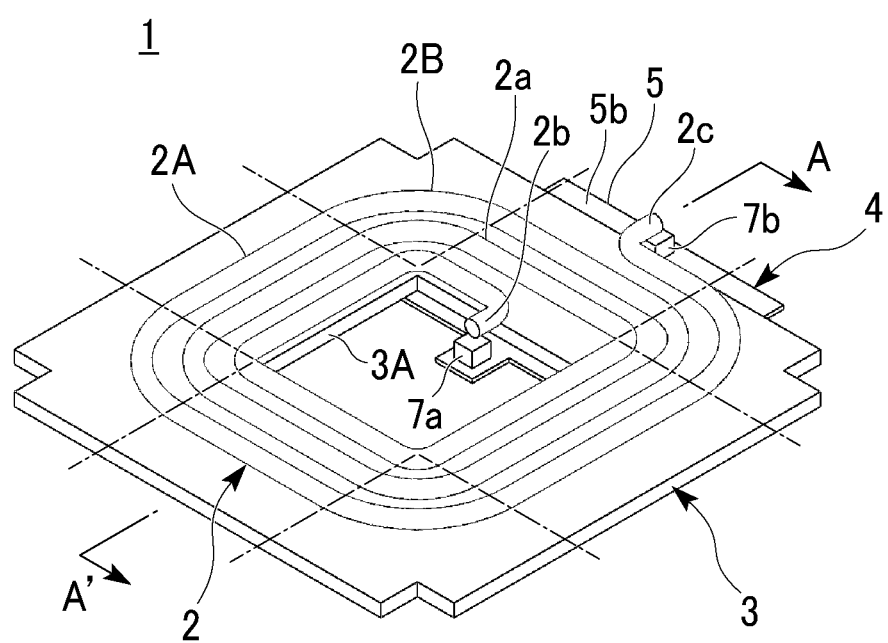
FIG. 3 is a perspective view showing a configuration example of a coil unit to which the present disclosure is applied.
Figure 4:
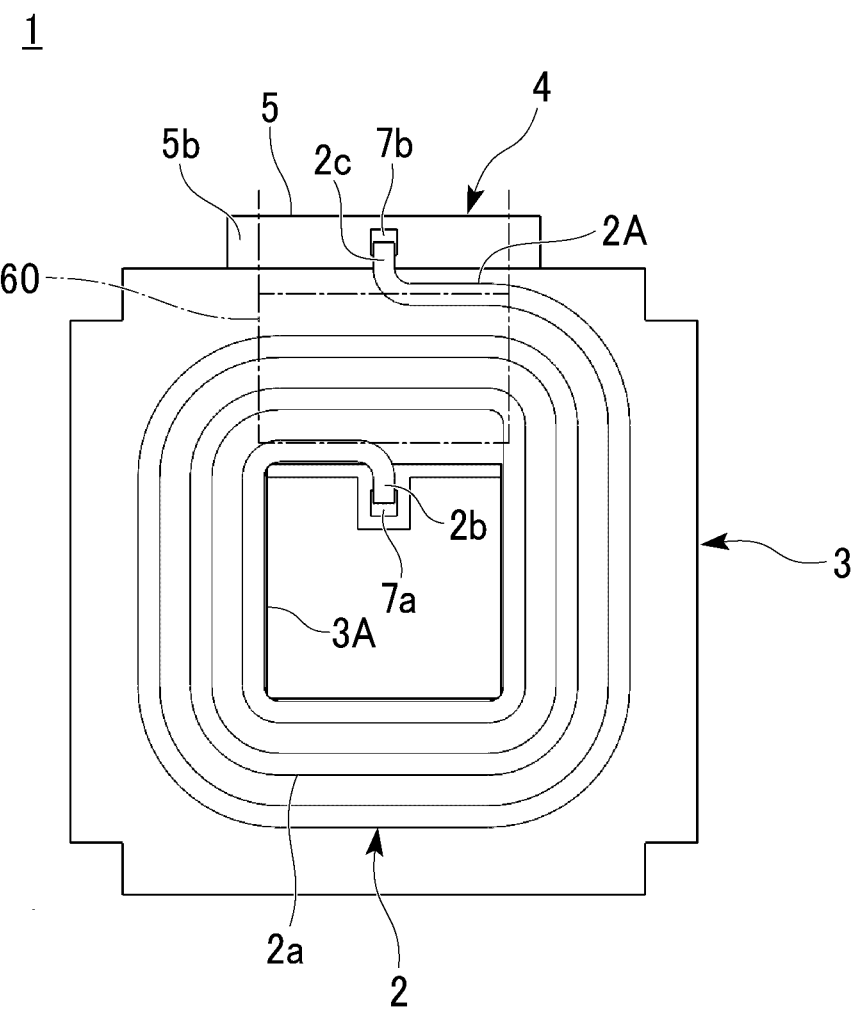
FIG. 4 is a plan view of the coil unit to which the present disclosure is applied, as viewed from a coil side.
Figure 5:
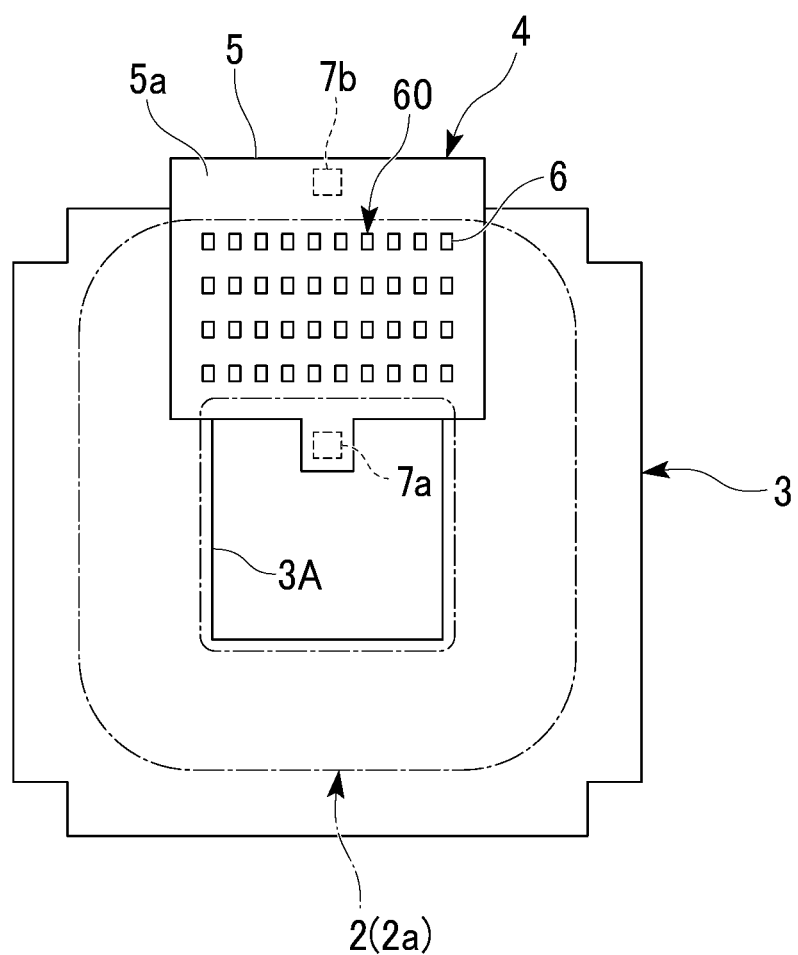
FIG. 5 is a plan view of the coil unit to which the present disclosure is applied, as viewed from a capacitor module side.

Next, as a coil unit to which the present disclosure is applied, for example, a coil unit 1 shown in FIG. 3 to FIG. 5 will be described. Further, FIG. 3 is a perspective view showing a configuration example of the coil unit 1. FIG. 4 is a plan view of the coil unit 1 as viewed from a coil surface side. FIG. 5 is a plan view of the coil unit 1 as viewed from a capacitor module side.

The coil unit 1 of the embodiment is applicable to an LC circuit 110 on the wireless power transmission device 101 side, an LC circuit 111 on the wireless power receiving device 102 side, or both of the LC circuits 110 and 111.

Specifically, the coil unit 1 includes a planar coil (coil) 2, a capacitor module 4 connected to the coil and constituting a resonance circuit, and a magnetic body 3 provided between the planar coil 2 and the capacitor module 4.

That is, the coil unit 1 has a structure in which the planar coil 2, the magnetic body 3 and the capacitor module 4 are stacked in sequence. Further, the planar coil 2, the magnetic body 3 and the capacitor module 4 included in the coil unit 1 are accommodated in a housing (not shown).

The planar coil 2 is a coil, a conductor of which is provided in a spiral shape. The conductor used for the planar coil 2 is not particularly limited. As the conductor, a member obtained by winding a Litz wire formed of copper, aluminum, or the like, in a planar spiral shape, a member obtained by patterning a metal foil formed of copper, aluminum, or the like, in a planar spiral shape, or the like, can be used. Hereinafter, in the embodiment, a case in which the planar coil 2 uses a conducting wire as the conductor and has a configuration in which the conducting wire is wound will be described as an example.

The planar coil 2 has a winding section (a portion in which a conductor is provided in a spiral shape) 2a in which a conducting wire is wound in a planar spiral shape, a first wiring section 2b extending from an end portion (one end side of the portion in which the conductor is provided in a spiral shape) on an inner circumferential side of the winding section 2a toward the circumferential inside, and a second wiring section 2c extending from an end portion (the other end side of the portion in which the conductor is provided in a spiral shape) on an outer circumferential side of the winding section 2a toward the circumferential outside.

The winding section 2a is constituted by four linear regions 2A in which the conducting wire extends linearly, and four curved regions 2B provided between the neighboring linear regions 2A and in which the conducting wire extends in an arc shape. That is, the winding section 2a is formed in a substantially quadrangular shape, corner sections of which are rounded, as viewed in a plan view. While a shape of the winding section 2a has been described as an example in which the winding section 2a has a substantially quadrangular shape, corner sections of which are rounded, as viewed in a plan view in the coil unit 1 of the embodiment, the shape is not particularly limited thereto and may be a polygonal shape, corner sections of which are rounded, or may be a concentric circular shape.

The magnetic body 3 is has an area larger than a range overlapping at least the winding section 2a of the planar coil 2 as viewed in a plan view, and is formed in a rectangular flat plate shape. A material of the magnetic body 3 is not particularly limited, and for example, a soft magnetic material such as ferrite or the like, a polymer sheet to which a high permeability material is added, or the like, may be used. In addition, the magnetic body 3 may be used as a plurality of split bodies.

The magnetic body 3 has an opening section 3A in a center thereof. The opening section 3A is provided along an inner circumference of the planar coil 2 to be disposed inside the inner circumference of the planar coil 2 as viewed in a plan view. When the opening section 3A is formed in the center of the magnetic body 3, the first wiring section 2b of the planar coil 2 and one of connecting terminals of the capacitor module 4, which will be described below, can be electrically connected to each other on an inner circumferential side of the planar coil 2.

As shown in FIG. 3 to FIG. 5, the capacitor module 4 includes a substrate 5 having a first main surface 5a and a second main surface 5b that face each other in a thickness direction, and a capacitor element group including a plurality of capacitor elements 6 mounted on at least the first main surface 5a of the substrate 5 and arranged in an array form.

The substrate 5 is constituted by a double-sided printed wiring board in which a plurality of wiring patterns (not shown) are provided on both surfaces of an insulating substrate formed in a substantially rectangular flat plate shape as a whole.

The plurality of capacitor elements 6 are constituted by lamination ceramic chip capacitors formed in a substantially rectangular shape as viewed in a plan view. Each of the capacitor elements 6 is mounted on the substrate 5.

While the plurality of capacitor elements 6 that constitute a capacitor element group have a structure in which neighboring capacitor elements 6 are connected to each other on the first main surface 5a, a connecting method is not particularly limited. For example, as shown in FIG. 5, a capacitor element array in which a plurality of capacitor elements 6 arranged in one direction are connected serially to each other may be formed. In addition, the capacitor element array may have a structure in which a plurality of capacitor element arrays are connected in parallel to each other in another direction perpendicular to the one direction.

The capacitor element group is provided in an element region 60 on a main surface 5a of the substrate 5. While a shape of the element region 60 is not particularly limited, the shape may be a rectangular shape. Accordingly, reduction in size and integration of the element region 60 can be achieved.

In the coil unit 1 of the embodiment, as shown in FIG. 4 and FIG. 5, the element region 60 formed on the capacitor module 4 is provided in a range overlapping the winding section 2a of the planar coil 2 as viewed in a plan view. That is, a structure in which the element region 60 is disposed at a side opposite to the winding section 2a with the magnetic body 3 sandwiched therebetween is provided. Accordingly, since the capacitor module 4 is not disposed on the same side as the surface on which the coil 2 having a large magnetic flux generated from the winding section 2a of the coil 2 is provided, linkage between the capacitor elements 6 of the capacitor module 4 and the magnetic flux can be minimized, and heat generation of the capacitor elements 6 can be minimized. Accordingly, dispersion of a magnetic field generated from the coil 2 in a coil circumferential direction can be reduced.

In addition, the element region 60 is preferably provided in a range overlapping the linear regions 2A of the winding section 2a of the planar coil 2 as viewed in a plan view. Accordingly, in a range in which an influence of a magnetic flux cannot be easily received, a larger number of capacitor elements 6 can be mounted in the element region 60.

As shown in FIG. 3 to FIG. 5, the capacitor module 4 has a first connecting terminal 7a electrically connected to the first wiring section 2b of the coil 2, and a second connecting terminal 7b electrically connected to the second wiring section 2c of the coil 2.

The first connecting terminal 7a and the second connecting terminal 7b are external connecting terminals of the capacitor module 4 and provided on the second main surface 5b of the substrate 5 in a protrusion shape protruding upward. In addition, the first connecting terminal 7a and the second connecting terminal 7b are provided outside the element region 60 and provided to face each other with the element region 60 sandwiched therebetween when the substrate 5 is viewed in a plan view. That is, the first connecting terminal 7a and the second connecting terminal 7b are provided at positions that are symmetrical to each other with the element region 60, in which the capacitor element group is provided on a surface of the substrate 5, sandwiched therebetween.

The first connecting terminal 7a of the capacitor module 4 is provided inside the winding section 2a of the planar coil 2 as viewed in a plan view. In addition, the second connecting terminal 7b of the capacitor module 4 is provided outside the winding section 2a of the planar coil 2 as viewed in a plan view. Further, the planar coil 2 and the capacitor module 4 are disposed such that a direction in which the first connecting terminal 7a and the second connecting terminal 7b are connected and a direction in which a conducting wire (a conductor) extends in the winding section 2a of the planar coil 2 are perpendicular to each other.

Then, in the opening section 3A formed in the center of the magnetic body 3, the first connecting terminal 7a of the capacitor module 4 and the first wiring section 2b of the planar coil 2 are electrically connected to each other. Further, the second connecting terminal 7b of the capacitor module 4 and the second wiring section 2c of the planar coil 2 are electrically connected to each other outside the magnetic body 3.

The coil unit 1 of the embodiment constitutes a resonance circuit as the planar coil 2 and the capacitor module 4 are connected to each other with such a positional relation.

According to the coil unit 1 of the embodiment, a configuration in which the pair of connecting terminals 7a and 7b of the capacitor module 4 are disposed linearly in order to electrically connect a central section of the planar coil 2 and the winding section 2a is provided. For this reason, the coil unit 1 can minimize dispersion of a magnetic field generated from the coil in the coil circumferential direction, and hold magnetic symmetry in the coil circumferential direction.

In addition, according to the coil unit 1 of the embodiment, in a state in which the magnetic body 3 is sandwiched between the winding section 2a of the planar coil 2 and the element region 60 of the capacitor module 4, the planar coil 2 and the capacitor module 4 are connected to each other. In other words, as viewed in a plan view, a configuration in which the element region 60 on which the plurality of capacitor elements 6 are mounted on a back side of the winding section 2a of the planar coil 2 via the magnetic body 3 is provided. For this reason, the coil unit 1 can minimize interlinkage between the capacitor elements 6 of the capacitor module 4 and the magnetic flux and minimize heat generation of the capacitor elements 6. That is, dispersion of a magnetic field generated from the coil 2 in the coil circumferential direction can be reduced.

Further, in the coil unit 1 of the embodiment, in order to achieve electrical insulation between the planar coil 2 and the magnetic body 3 or between the magnetic body 3 and the capacitor module 4, a configuration in which an insulating layer is provided between these parts according to necessity may be provided.

In addition, in addition to the first connecting terminal 7a and the second connecting terminal 7b for connection to the planar coil 2, two external terminals (not shown) are further provided on the capacitor module 4.

In addition, in the coil unit 1 of the embodiment, the planar coil 2 and the capacitor module 4 may be connected to each other in parallel, may be connected to each other in series, or may be connected to each other in parallel and in series.

Specifically, in the capacitor module 4, when the capacitor element group is electrically connected between the first connecting terminal 7a and one external terminal (not shown) of two external terminals (not shown), the planar coil 2 and the capacitor module 4 are connected to each other in series. Similarly, in the capacitor module 4, when the capacitor element group is electrically connected between the second connecting terminal 7b and the other external terminal (not shown) of the two external terminals (not shown), the planar coil 2 and the capacitor module 4 are connected to each other in series.

On the other hand, when the capacitor element group is electrically connected between the first connecting terminal 7a and the second connecting terminal 7b, the planar coil 2 and the capacitor module 4 are connected to each other in parallel. In this case, the one external terminal (not shown) of the two external terminals (not shown) may be directly connected to the first connecting terminal 7a or may be connected to the first connecting terminal 7a via a wiring (not shown) formed on the substrate 5. Similarly, the other external terminal (not shown) of the two external terminals (not shown) may be directly connected to the second connecting terminal 7b or may be connected to the second connecting terminal 7b via a wiring (not shown) formed on the substrate 5.

In the coil unit 1 of the embodiment having the above-mentioned configuration, interlinkage between the capacitor elements 6 of the capacitor module 4 and the magnetic flux can be minimized, and heat generation of the capacitor elements 6 can be minimized. In addition, dispersion of a magnetic field generated in the coil in the coil circumferential direction can be minimized. Accordingly, it is possible to provide the coil unit capable of further improving power transmission efficiency while reducing an influence due to damage of magnetic symmetry of the coil.

In addition, since the coil unit 1 of the embodiment has a structure in which the planar coil 2 and the capacitor module 4 are integrally stacked, the coil unit 1 may be appropriately used for either one or both of a coil unit (an LC circuit unit) 110 included in the wireless power transmission device 101 and a coil unit (an LC circuit unit) 111 included in the wireless power receiving device 102.

Figure 6:
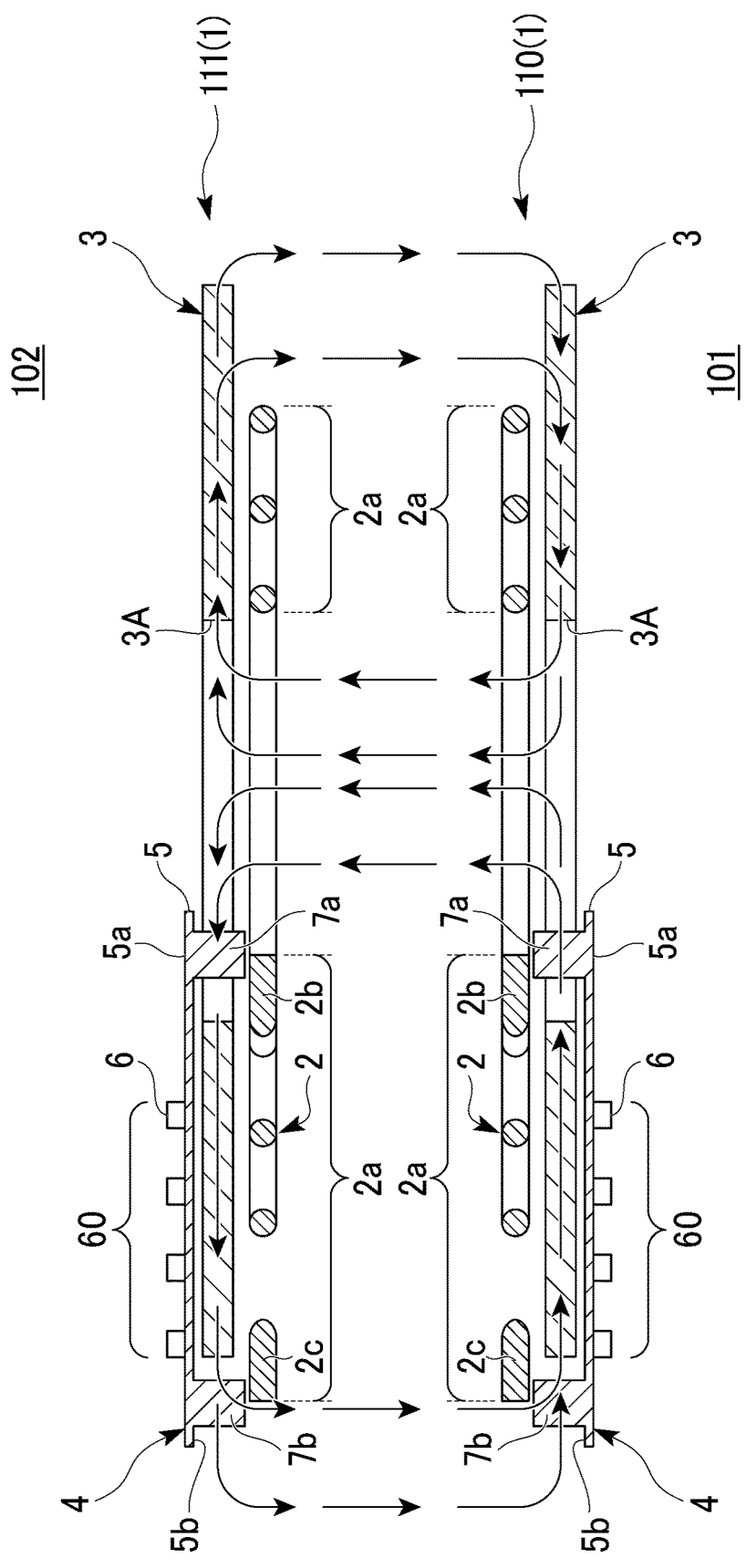
FIG. 6 is a cross-sectional view showing an example of the wireless power transmission device and the wireless power receiving device according to the embodiment of the present disclosure.

Here, FIG. 6 is a view showing an example of a wireless power transmission device and a wireless power receiving device according to the embodiment of the present disclosure. In addition, FIG. 6 is a cross-sectional view taken along line A-A' shown in FIG. 2. As shown in FIG. 6, according to the wireless power transmission device 101 and the wireless power receiving device 102 using the coil unit 1 of the embodiment, interlinkage between the capacitor elements 6 of the capacitor module 4 and the magnetic flux can be minimized, and heat generation of the capacitor elements 6 can be minimized. In addition, dispersion of a magnetic field generated from the planar coil 2 in the coil circumferential direction can be minimized. Accordingly, since an influence due to damage to magnetic symmetry of the coil can be reduced, further improvement of power transmission efficiency becomes possible.

Accordingly, in the wireless power transmission system 100 using the coil unit 1 of the embodiment, even when dispersion of a magnetic flux generated from the coil in the wireless power transmission device 101 and the wireless power receiving device 102 in the coil circumferential direction is minimized and a positional deviation occurs between the wireless power transmission device 101 and the wireless power receiving device 102, properties of the coil are not varied according to a direction of the positional deviation. Accordingly, wireless power transmission can be stably performed between the wireless power transmission device 101 and the wireless power receiving device 102.

Further, the present disclosure is not particularly limited to the embodiment and various modifications may be made without departing from the spirit of the present disclosure. For example, in the coil unit 1 of the above-mentioned embodiment, a coil including a winding section on which a conducting wire is wound in a spiral shape may be applied instead of the planar coil 2. In addition, the first and second wiring sections 2b and 2c of the coil may be obtained by extracting a conducting wire of the winding section 2a.

Figure 7:
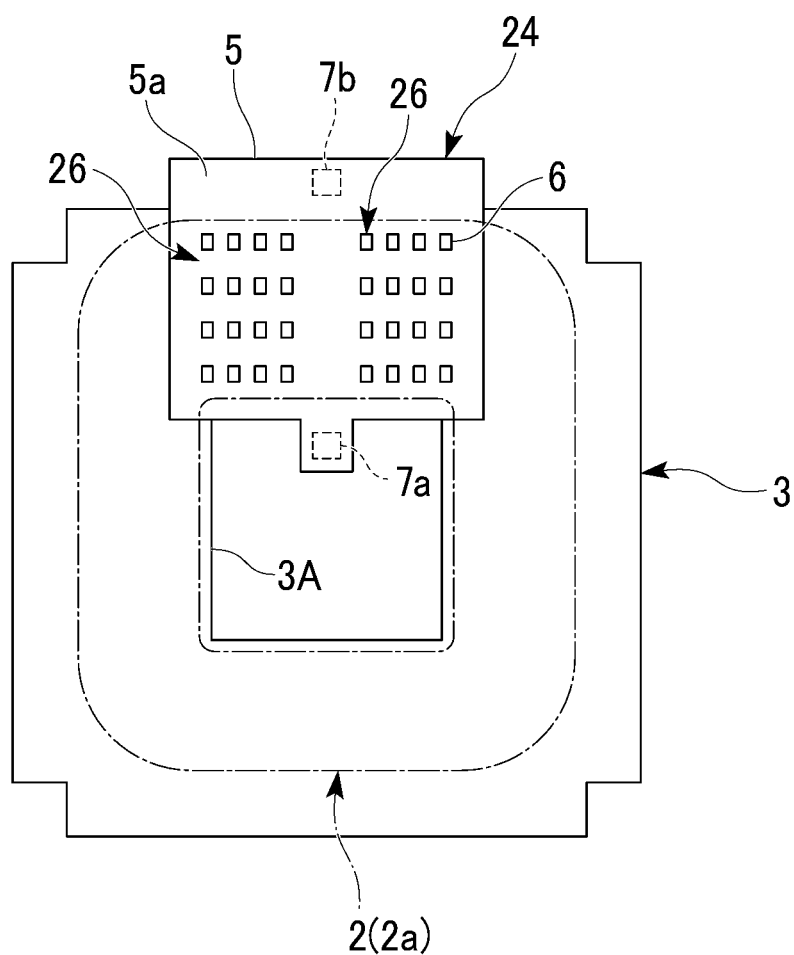
FIG. 7 is a plan view showing a variant of the coil unit to which the present disclosure is applied, as viewed from a capacitor module side.

In addition, in the coil unit 1 of the above-mentioned embodiment, while a configuration in which the capacitor module 4 has one element region 60 has been described, there is no limitation thereto. For example, as shown in FIG. 7, a capacitor module 24 may be a coil unit 21 having two element regions 26 or more.

In addition, in the coil unit 1 of the above-mentioned embodiment, while the configuration in which the element region 60 is provided on the first main surface 5a of the capacitor module 4 has been exemplarily described as an example, there is no limitation thereto. For example, in the coil unit 1 of the above-mentioned embodiment, a configuration in which the element region 60 is provided on the second main surface 5b may be provided, or a configuration in which one element region 60 or more are provided on both of main surfaces may be provided.

Figure 8:
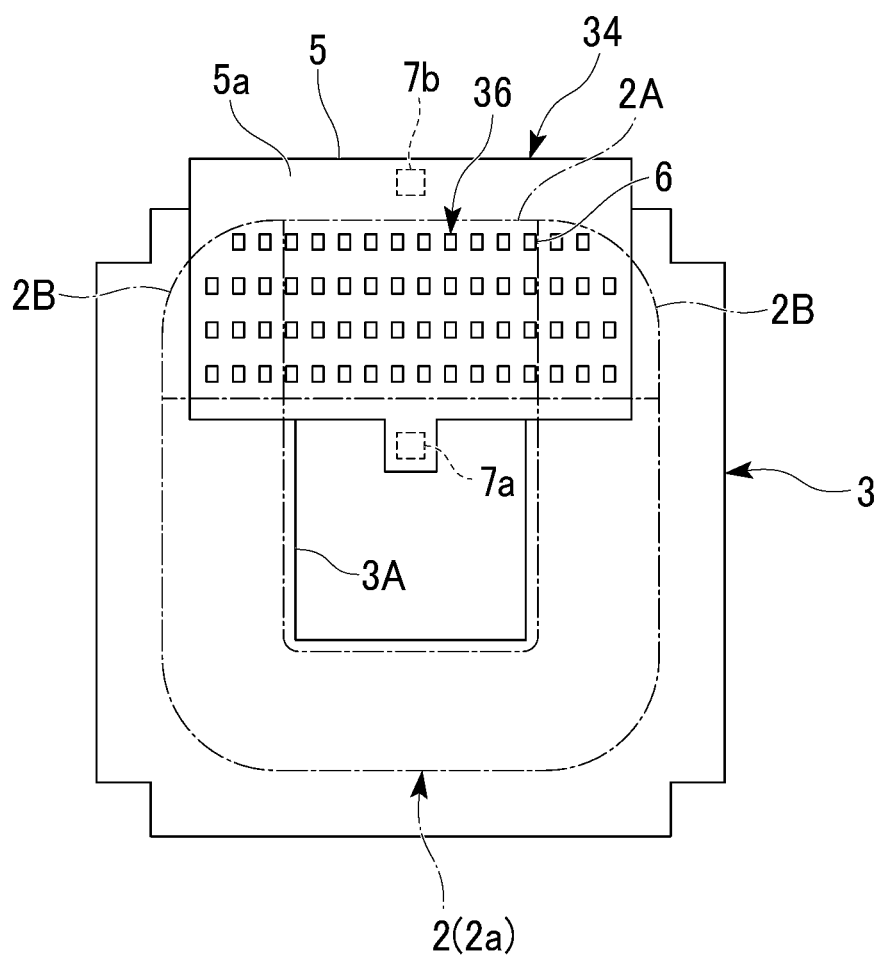
FIG. 8 is a plan view of a variant of the coil unit to which the present disclosure is applied, as viewed from a capacitor module side.

In addition, in the coil unit 1 of the above-mentioned embodiment, while the example in which one element region 60 is provided on a region overlapping one linear region 2A of the winding section 2a as viewed in a plan view has been described as an example, there is no limitation thereto. For example, as shown in FIG. 8, a capacitor module 34 may be a coil unit 31 having an element region 36 disposed in a range overlapping the linear regions 2A and the curved regions 2B as viewed in a plan view.

While preferred embodiments of the invention have been described and illustrated above, it should be understood that these are exemplary of the invention and are not to be considered as limiting. Additions, omissions, substitutions, and other modifications can be made without departing from the spirit or scope of the present disclosure. Accordingly, the invention is not to be considered as being limited by the foregoing description, and is only limited by the scope of the appended claims.

EXPLANATION OF REFERENCES 1, 21, 31: Coil unit
2: Planar coil (coil)
2a: Winding section (a portion on which a conductor is formed in a spiral shape)
2b: First wiring section
2c: Second wiring section
3: Magnetic body
4, 24, 34: Capacitor module
5: Substrate
5a: First main surface
5b: Second main surface
6: Capacitor element
7a: First connecting terminal
7b: Second connecting terminal
26, 36, 60: Element region
100: Wireless power transmission system
200: Wireless power transmission device
201: Conversion circuit
202: Power transmission circuit
203: Power transmission coil unit
300: Wireless power receiving device
301: Power receiving coil unit
303: Rectification smoothing circuit
L1: Power transmission coil
L2: Power receiving coil
C1: Power transmission-side capacitor
C2: Power receiving-side capacitor
EV: Electric automobile
Vload: Load

What is claimed is:

1. A coil unit comprising:
a coil having a conductor, a spiral portion of the conductor being formed in a spiral shape;
a capacitor module connected to the coil and constituting a resonance circuit with the coil, the capacitor module having:
a substrate having a first main surface and a second main surface facing each other in a thickness direction;
a plurality of capacitor elements mounted on at least one of the first main surface and the second main surface in an element region;
a first connecting terminal provided outside the element region in a plan view; and
a second connecting terminal provided outside the element region to face the first connecting terminal with the element region sandwiched therebetween in the plan view; and
a magnetic body provided between the coil and the capacitor module,
wherein one of the first connecting terminal and the second connecting terminal is: overlapping the spiral portion in the plan view; and electrically connected to a first wiring section extending inward from one end side of the spiral portion, and the other connecting terminal is: not overlapping the spiral portion in the plan view; and electrically connected to a second wiring section extending outward from the other end side of the spiral portion,
a direction in which the first connecting terminal and the second connecting terminal are connected is perpendicular to a direction in which the conductor extends in the spiral portion, and
the element region overlaps the spiral portion in the plan view.

2. The coil unit according to claim 1, wherein the magnetic body has an area larger than an area of the element region that overlaps the spiral portion in the plan view.

3. The coil unit according to claim 1, wherein the spiral portion is constituted by two linear regions or more in which the conductor extends linearly, and two curved regions or more in which the conductor extends in an arc shape and provided between the linear regions.

4. The coil unit according to claim 2, wherein the spiral portion is constituted by two linear regions or more in which the conductor extends linearly, and two curved regions or more in which the conductor extends in an arc shape and provided between the linear regions.

5. The coil unit according to claim 3, wherein the element region overlaps the linear region of the spiral portion in the plan view.

6. The coil unit according to claim 4, wherein the element region overlaps the linear region of the spiral portion in the plan view.

7. The coil unit according to claim 3, wherein the element region overlaps the linear region and the curved region in the plan view.

8. The coil unit according to claim 4, wherein the element region overlaps the linear region and the curved region in the plan view.

9. The coil unit according to claim 5, wherein the element region overlaps the linear region and the curved region in the plan view.

10. The coil unit according to claim 1, wherein the capacitor module has two element regions or more.

11. The coil unit according to claim 2, wherein the capacitor module has two element regions or more.

12. The coil unit according to claim 3, wherein the capacitor module has two element regions or more.

13. The coil unit according to claim 4, wherein the capacitor module has two element regions or more.

14. The coil unit according to claim 5, wherein the capacitor module has two element regions or more.

15. The coil unit according to claim 6, wherein the capacitor module has two element regions or more.

16. The coil unit according to claim 7, wherein the capacitor module has two element regions or more.

17. The coil unit according to claim 8, wherein the capacitor module has two element regions or more.

18. The coil unit according to claim 9, wherein the capacitor module has two element regions or more.

19. A wireless power transmission device configured to transmit electric power wirelessly, the wireless power transmission device comprising the coil unit according to claim 1.

20. A wireless power receiving device configured to receive electric power wirelessly, the wireless power receiving device comprising the coil unit according to claim 1.

21. A wireless power transmission system configured to transmit electric power wirelessly from a wireless power transmission device toward a wireless power receiving device, wherein at least one of the wireless power transmission device and the wireless power receiving device comprises the coil unit according to claim 1.

* * * * *